(12) United States Patent
Topoulos

(10) Patent No.: US 8,445,569 B2
(45) Date of Patent: May 21, 2013

(54) SALT RESISTANT POLYAMIDE COMPOSITIONS

(75) Inventor: Georgios Topoulos, Meyrin (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 68 days.

(21) Appl. No.: 13/198,826

(22) Filed: Aug. 5, 2011

(65) Prior Publication Data

US 2012/0046398 A1    Feb. 23, 2012

Related U.S. Application Data

(60) Provisional application No. 61/374,356, filed on Aug. 17, 2010.

(51) Int. Cl.
*C08K 5/435* (2006.01)

(52) U.S. Cl.
USPC .......................................... 524/169

(58) Field of Classification Search
USPC ................................. 524/168, 169
See application file for complete search history.

(56) References Cited

U.S. PATENT DOCUMENTS

| 4,076,664 | A | 2/1978 | Pagilagan |
| 4,123,411 | A | 10/1978 | Coran |
| 4,801,633 | A | 1/1989 | Mason et al. |
| 6,249,928 | B1 | 6/2001 | Wang |
| 7,750,110 | B2 | 7/2010 | Blondel et al. |
| 2006/0074158 | A1 * | 4/2006 | Blondel et al. ............... 524/169 |
| 2010/0028580 | A1 | 2/2010 | Palmer et al. |

FOREIGN PATENT DOCUMENTS

JP        3271325        4/2002

* cited by examiner

*Primary Examiner* — John Uselding

(57) ABSTRACT

Disclosed is a thermoplastic composition including:
a) 20 to 35 weight percent poly(decamethylene decanediamide),
b) 50 to 65 weight percent poly(hexamethylene decanediamide), and
c) 8 to 15 weight percent of sulfonamide plasticizer.
wherein the sulfonamide plasticizer is one or more sulfonamides selected from the group consisting of N-butylbenzenesulfonamide, N-(2-hydroxypropyl)benzenesulfonamide, N-ethyl-o-toluenesulfonamide, N-ethyl-p-toluenesulfonamide, o-toluenesulfonamide, and p-toluenesulfonamideone.

3 Claims, No Drawings

SALT RESISTANT POLYAMIDE COMPOSITIONS

CROSS REFERENCE TO RELATED APPLICATIONS

This application claims the benefit of U.S. Provisional Application No. 61/374,356 filed Aug. 17, 2010, which is incorporated herein by reference in its entirety.

FIELD OF INVENTION

The present invention relates to the field of polyamide compositions having improved salt resistance and molded and extruded thermoplastic articles.

BACKGROUND OF INVENTION

Polymeric materials, including thermoplastics and thermosets, are used extensively in automotive vehicles and for other purposes. They are light and relatively easy to fashion into complex parts, and are therefore preferred instead of metals in many instances. However a problem with some polymers is salt stress (induced) corrosion cracking (SSCC), where a part under stress undergoes accelerated corrosion when under stress and in contact with inorganic salts. This often results in cracking and premature failure of the part.

Polyamides such as polyamide 6,6, polyamide 6, polyamide 6,10 and polyamide 6,12 have been made into and used as vehicular parts and other types of parts. While it has been reported that polyamides 6,10 and 6,12 are more resistant to SSCC (see for instance Japanese Patent 3271325B2), all of these polyamides are prone to SSCC in such uses, because for instance, various sections of vehicles and their components are sometimes exposed to salts, for example salts such as sodium chloride or calcium chloride used to melt snow and ice in colder climates. Corrosion of metallic parts such as fittings and frame components made from steel and various iron based alloys in contact with water and road salts can also lead to formation of salts. These salts, in turn, can attack the polyamide parts making them susceptible to SSCC. Thus polyamide compositions with better resistance to SSCC are desired.

U.S. Pat. No. 4,076,664 discloses a terpolyamide resin that has favorable resistance to zinc chloride.

Plasticized long chain polyamides play an important role in the automotive tubing market. Long chain polyamides, that is, a polyamide derived from at least one monomer unit having at least 10 carbon atoms connected in a linear array, are known for having good salt resistance. Salt resistance is a necessary quality in many automotive parts, due to components exposure to the winter salting conditions. The drawback of plastification is that it decreases the salt resistance of long chain polyamides such as PA1010, PA12, PA11.

U.S. Pat. No. 7,750,110 B2 discloses flexible semicrystalline polyamides useful for manufacturing parts by extrusion or injection molding including polyamide blends and plasticizers.

The objective of the invention is to improve the salt resistance of sulphonamide plasticized long chain nylons.

SUMMARY OF INVENTION

Disclosed is a thermoplastic composition consisting essentially of:
a) 20 to 35 weight percent poly(decamethylene decanediamide),
b) 50 to 65 weight percent poly(hexamethylene decanediamide), and
c) 8 to 15 weight percent of sulfonamide plasticizer.
wherein the sulfonamide plasticizer is one or more sulfonamides selected from the group consisting of N-butylbenzenesulfonamide, N-(2-hydroxypropyl)benzenesulfonamide, N-ethyl-o-toluenesulfonamide, N-ethyl-p-toluenesulfonamide, o-toluenesulfonamide, and p-toluenesulfonamide.

DETAILED DESCRIPTION

Poly(decamethylene decanediamide) (PA1010) and poly(hexamethylene decanediamide) (PA610) are useful in the thermoplastic composition. PA1010 is a homopolymer derived from polymerization of decamethylene diamine and decanedioic acid. PA610 is a homopolymer derived from polymerization of hexamethylene diamine and decanedioic acid. Other aliphatic dicarboxylic acids and aliphatic diamines may be present in PA 1010 and PA610, but only to the extent that they do not affect the salt resistant properties of the resin. For instance in one embodiment other aliphatic dicarboxylic acids and aliphatic diamines may be present at about 0.1 to 3 weight percent based on the total mole percent of diamine and/or dicarboxylic acid. Other dicarboxylic acid monomers include decanedioic acid (C10), dodecanedioic acid (C12), and tetradecanedioic acid (C14). Other aliphatic diamines include decamethylene diamine, and dodecamethylene diamine.

Preferably the thermoplastic composition consist essentially of 25 to 35 weight percent PA1010, 50 to 60 weight percent PA610 and 8 to 15 weight percent sulfonamide plasticizer. Another embodiment is the thermoplastic composition consisting essentially of 25 to 30 weight percent PA1010, 55 to 60 weight percent PA610 and 10 to 15 weight percent sulfonamide plasticizer.

The polyamide composition includes a sulfonamide plasticizer. Suitable sulfonamide plasticizers include aromatic sulfonamides such as benzenesulfonamides and toluenesulfonamides. Examples of suitable sulfonamides include N-alkyl benzenesulfonamides and toluenesufonamides, such as N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide.

The plasticizer may be incorporated into the composition by melt-blending the polymer with plasticizer and, optionally, other ingredients, or during polymerization. If the plasticizer is incorporated during polymerization, the polyamide monomers are blended with one or more plasticizers prior to starting the polymerization cycle and the blend is introduced to the polymerization reactor. Alternatively, the plasticizer can be added to the reactor during the polymerization cycle.

The plasticizer is present in the composition in about 1 to about 20 weight percent, or more preferably in about 6 to about 18 weight percent, or yet more preferably in about 8 to about 15 weight percent, wherein the weight percentages are based on the total weight of the composition.

In the present invention, the polyamide composition may also comprise other additives commonly used in the art, such as heat stabilizers or antioxidants, antistatic agents, blowing agents, lubricants, and colorant and pigments.

Herein the thermoplastic composition is a mixture made by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained.

In another aspect, the present invention relates to molded or extruded thermoplastic articles by shaping the thermoplastic composition of the invention. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The molded or extruded thermoplastic articles disclosed herein may have application in automotive and other components that meet one or more of the following requirements: high chemical resistance to polar chemicals such as such as zinc chloride and calcium chloride, high impact requirements; resistance to oil and fuel environment; resistance to chemical agents such as coolants; low permeability to fuels and gases, e.g. carbon dioxide. Specific extruded or molded thermoplastic articles are selected from the group consisting of pipes for transporting liquids and gases, inner linings for pipes, fuel lines, air break tubes, coolant pipes, air ducts, pneumatic tubes, hydraulic houses, cable covers, cable ties, connectors, canisters, and push-pull cables.

The present invention is further illustrated by the following examples. It should be understood that the following examples are for illustration purposes only, and are not used to limit the present invention thereto.

Methods

Compounding

Examples 1 and Comparative examples C1-C4 were prepared by melt blending the ingredients listed in the Table in a 40 mm twin screw extruder (Berstorff UTS40) operating at about 250° C. for all compositions, using a screw speed of about 250 rpm, and a throughput of 90 kg/hour. Ingredient quantities shown in the Table are given in weight percent on the basis of the total weight of the thermoplastic composition.

The compounded mixture was extruded in the form of laces or strands, cooled in a water bath, chopped into granules and placed into sealed aluminum lined bags in order to prevent moisture pick up. The cooling and cutting conditions were adjusted to ensure that the materials were kept below 0.15 wt % of moisture level.

Physical Properties Measurement

Mechanical tensile properties, i.e. E-modulus, stress at break (Tensile strength) and strain at break (elongation at break) were measured according to ISO 527-2/5A. Measurements were made on injection molded ISO tensile bar. The mold temperature was 60° C., and melt temperature was 235° C. for the C1 and 250° C. for C2, C3, C4 and E1.

The thickness of the test specimens was 2 mm and a width of 4 mm according to ISO 527/5A at a testing speed of 50 mm/min (tensile strength and elongation). Tensile Modulus was measured at 1.0 mm/min. Table 1 list the average results of 6 samples tested for each composition.

Salt Resistance Characterization

Test pieces used where injection molded tensile bars type 5A described in the 150527 norm.

The bars were bent into U-shape and positioned, bent upwards into inox specimen holders made in DuPont laboratory having inside width of 11.95 mm. Three bars were used for each formulation. The holders were positioned into large test tubes.

The test fluid used was 50 weight percent zinc chloride solution prepared by dissolving anhydrous zinc chloride into water in 50:50 weight ratio. The test tubes containing specimen holders were filled with freshly prepared salt solution fully immersing the test pieces such that there was at least 12 mm of fluid above the top of the test piece. The test tubes were positioned upright in a circulating air oven maintained at 60° C. After 72 h the test pieces in the specimen holders were removed from test tubes with zinc chloride solution and air oven aged (AOA) in the same circulating air oven at 60° C. for 24 h. After that period, the specimen holders together with test bars were again positioned into the test tubes with zinc chloride solution and positioned upright in a circulating air oven maintained at 60° C. Several such cycles were performed with time intervals specified in Table 1. Test pieces were periodically examined for development of cracks after immersion and after AOA.

Materials

PA610 refers to Zytel® RS3060 polyamide 610 made from 1,6-diaminohexane and 1,10-decanedioic acid available from E.I. DuPont de Nemours and Company, Wilmington, Del., USA.

PA1010 refers to Zytel® FE110004 polyamide 1010 made from 1,10-decanedioic acid and 1,10-diaminodecane available from E.I. DuPont de Nemours and Company, Wilmington, Del., USA.

Plasticizer refers to Uniplex® 214 plasticizer, N-butylbenzenesulfonamide available from Unitex Chemical Corp., Greensboro, N.C.

Irganox® 1098 is a phenolic primary antioxidant for processing and long-term thermal stabilization: N—N'-hexane-1,6-diylbis(3-(3,5-di-tert-butyl-4-hydroxyphenylpropionanamide)) available from, Ciba Specialty Chemicals.

Chimasorb® 944 is an oligomeric hindered amine light stabilizer: Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) available from, Ciba Specialty Chemicals.

Crodamide 212 refers to stearyl erucamide available from Croda Chemicals, Hull UK.

Example 1 and Comparative Examples C1-C4

Example 1 and Comparative Examples C1-C4, listed in Table 1, were melt-blended and molded into test specimens.

Example 1 exhibited zinc chloride salt resistance in consecutive ageing tests that was better than C1 (PA1010) and C4 (PA610). This indicated that the blend of PA1010 and PA610 exhibited a unexpected synergistic effect in salt resistance, that was not present in the single polyamide formulations, or C2 or C3 compositions.

TABLE 1

| Example | C1 | C2 | C3 | 1 | C4 |
|---|---|---|---|---|---|
| PA1010 | 86.9 | 57.9 | 43.35 | 29 | |
| PA610 | | 29 | 43.55 | 57.9 | 86.9 |
| Plasticizer-1 | 12 | 12 | 12 | 12 | 12 |
| Irganox ® 1098 | 0.3 | 0.3 | 0.3 | 0.3 | 0.3 |
| Irgafos ® 168 | 0.3 | 0.3 | 0.3 | 0.3 | 0.3 |
| Chimassorb ® 944 | 0.3 | 0.3 | 0.3 | 0.3 | 0.3 |
| Crodamide 212 | 0.2 | 0.2 | 0.2 | 0.2 | 0.2 |
| Physical Properties | | | | | |
| Tensile Strength (MPa) | 49 | 51 | 53 | 54 | 57 |
| Elongation at Break (%) | 207 | 153 | 187 | 255 | 183 |
| Tensile E-Modulus (MPa) | 463 | 495 | 555 | 549 | 677 |
| Salt Resistance Consecutive Ageing time-medium | | | | | |
| 72 h-ZnCl$_2$ | OK | OK | OK | OK | OK |
| 24 h-air | BREAK | OK | OK | OK | OK |
| 48 h-ZnCl$_2$ | — | OK | OK | OK | OK |
| 24 h-air | — | OK | OK | OK | OK |
| 72 h-ZnCl$_2$ | — | BREAK | BREAK | OK | OK |
| 24 h-air | — | — | — | OK | OK |
| 24 h-ZnCl$_2$ | — | — | — | OK | OK |
| 24 h-air | — | — | — | OK | BREAK |
| 24 h-ZnCl$_2$ | — | — | — | OK | — |
| 72 h-air | — | — | — | BREAK | — |

What is claimed is:

1. A thermoplastic composition consisting essentially of:
   a) 25 to 35 weight percent poly(decamethylene decanediamide),
   b) 55 to 65 weight percent poly(hexamethylene decanediamide), and
   c) 8 to 15 weight percent of sulfonamide plasticizer,
wherein the sulfonamide plasticizer is one or more sulfonamides selected from the group consisting of N-butylbenzenesulfonamide, N-(2-hydroxypropyl)benzenesulfonamide, N-ethyl-o-toluenesulfonamide, N-ethyl-p-toluenesulfonamide, o-toluenesulfonamide, and p-toluenesulfonamideone.

2. The thermoplastic composition of claim 1 wherein the sulfonamide plasticizer is N-butylbenzenesulfonamide.

3. A molded or extruded thermoplastic article comprising the thermoplastic composition of claim 1.

* * * * *